July 23, 1935.　　　　R. D. LYNCH　　　　2,008,764
CHECK SELECTING APPARATUS
Filed Aug. 7, 1933　　　　2 Sheets-Sheet 1
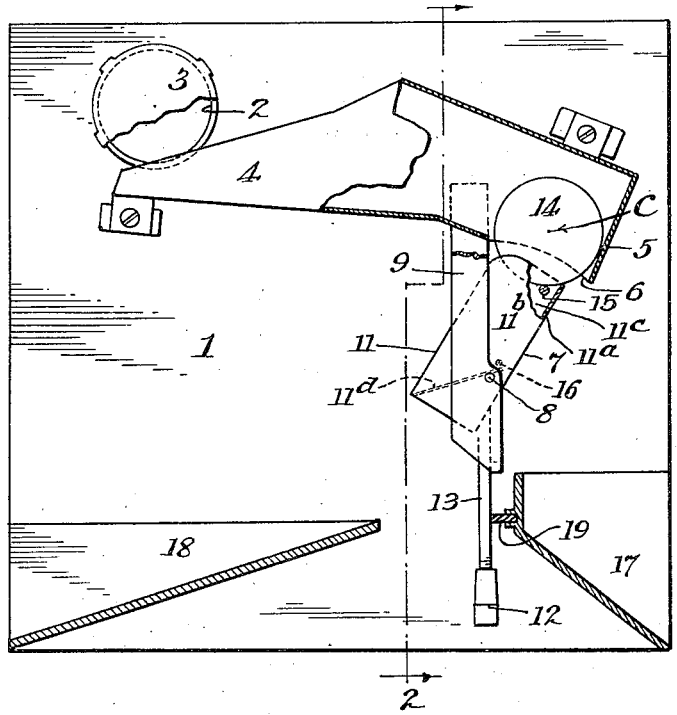
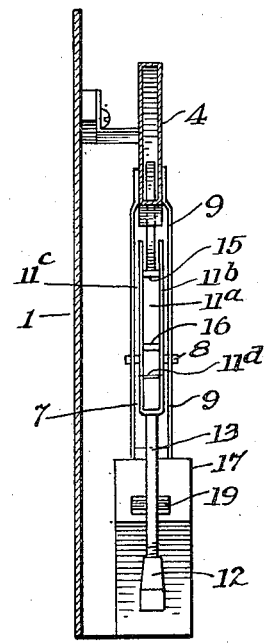
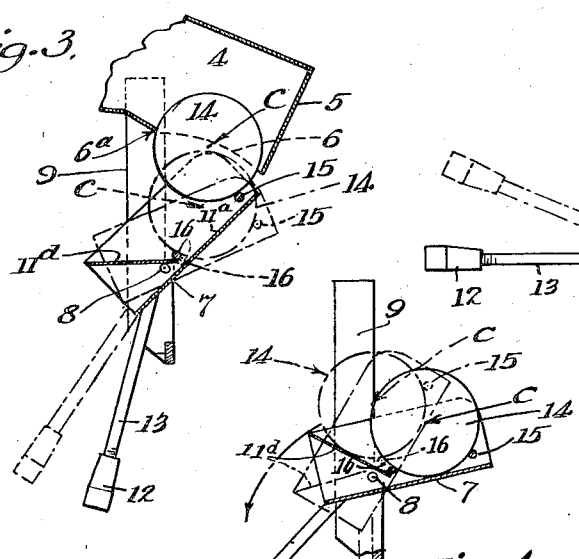
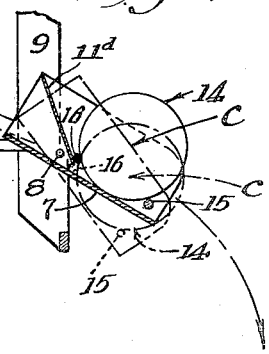
INVENTOR.
Ralph D. Lynch,
BY
ATTORNEYS.

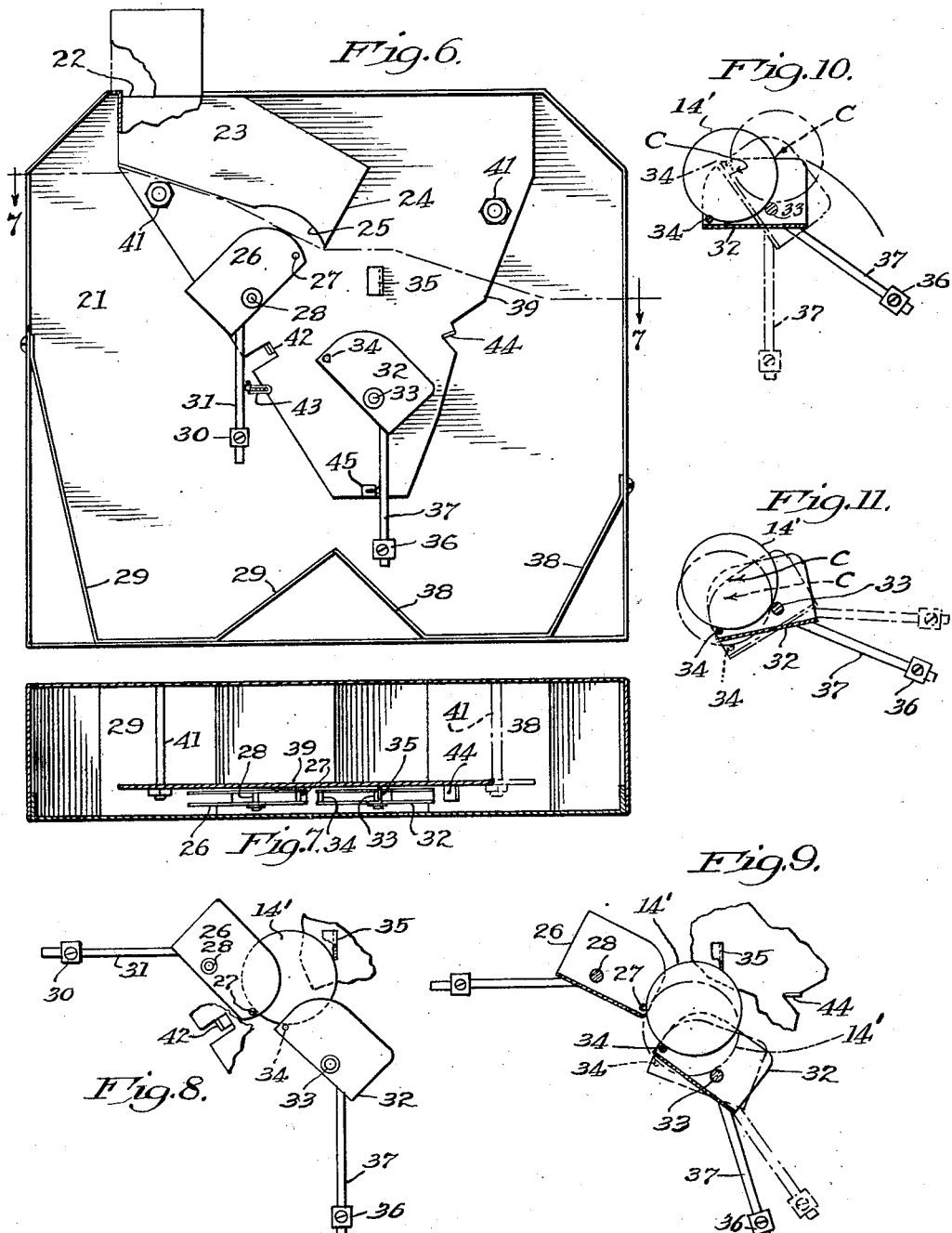

Patented July 23, 1935

2,008,764

UNITED STATES PATENT OFFICE 2,008,764

CHECK SELECTING APPARATUS

Ralph D. Lynch, Los Angeles, Calif., assignor of one-half to Harry J. Crawford, Venice, Calif.

Application August 7, 1933, Serial No. 683,932

13 Claims. (Cl. 194—103)

This invention relates to apparatus for selecting coins or checks for use in connection with vending machines, coin-changing machines or other machines operated or controlled by coins or checks, and particularly to an apparatus for separating proper coins or checks from improper coins or checks, for the purpose of preventing fradulent operation of the vending machine or other apparatus with which the selecting device is associated.

The term "check", as used hereinafter will be understood to include any coin, check, or comparable article, consisting of metal or other material and capable of causing operation of such vending machines or other apparatus.

The principal object of the present invention is to provide a check-selecting apparatus adapted to separate proper checks from improper checks according to the weight thereof, whereby if a check of a weight differing from the legal or correct weight of the check which it is adapted to receive, is inserted in the device, it will be returned without causing operation of the vending machine or other device with which the selecting apparatus is associated.

A further object of the invention is to provide a device of the character immediately above set forth, which is adapted to reject a check that is over or underweight with respect to the correct or legal weight for such check.

A further object of the invention is to provide a device of the character described which functions in response to the weight of a check and is adapted to reject said check on occasion that said check is above or below the correct weight.

A further object of the invention is to provide a device of the character described which, in one embodiment, operates to select improper checks from proper checks by subjecting the same to a test to determine underweight thereof and to reject such check in the case it is underweight, or, if not underweight, to then subject such a check to a test to determine overweight thereof and to reject the check at this point if overweight.

The device of the present invention may comprise, for example, chute means associated with a weight testing means and adapted to receive a check and deliver the same by gravity through a suitable opening into position to be received by the weight testing means in such manner that the momentum of said check is substantially absorbed before delivery thereof to said means; the weight testing means preferably comprises a balance means pivotally mounted on an axis laterally removed from the center of gravity of the check which is in position to be received thereby, and, responsive to the weight of said check acting upon a long lever arm, adapted to rotate to allow said check to fall freely from said chute means and to receive said check in such position that the weight thereof acts upon a materially shorter lever arm than said first-named lever arm, and further responsive, due to the momentum imparted thereto by the check acting firstly upon the aforesaid long lever arm and secondly upon the short lever arm, and to the weight of said check acting upon said short lever arm, to move to a position to release and deliver said check to a suitable receiving chute or hopper if the weight of said check is equal to or in excess of an allowable minimum, or to overcome such momentum and weight of said check acting upon the above lever arms and release and deliver such a check to an alternate chute if the weight thereof is less than such allowable minimum. The delivery opening in the first-named chute means is preferably of such shape and disposition as to guide the check downwardly into engagement with the portion of the balance means which defines the long lever arm above-mentioned until said balance means has been moved into check-receiving position, and to thereupon release said check to allow the same to fall freely from said chute into full engagement by said balance means.

The balance means employed in the device of the present invention is preferably so positioned with respect to the check which it is to receive that it directly opposes the downward travel of said check under the action of gravity by contact with the lower edge of said check but is moved about its pivotal axis into a check-receiving position due to the downward force of said check acting upon a relatively long lever arm. Said balance means is also preferably provided with positioning means for preventing the received check from falling from the balance means when said balance means has assumed its check-receiving position and which will cause said check to move with said balance means as a unit so that the momentum of said means includes the momentum of said check, and the weight and momentum of said check acts on a lever arm materially less in length than said first-named lever arm, but which will allow the check to fall from said balance means if said balance means is rotatably moved a certain amount either side of this check-receiving position.

If it is desired to provide for subjecting a check to an underweight and overweight test, two separate weight testing means of substantially the same general character but adjusted to different equilibrium points may be provided, one following the other, whereby a check may be subjected to an underweight test, rejected if underweight, or delivered to a second balance means where it is again subjected to substantially the same operation, rejected if overweight, or if of correct weight allowed to pass into a portion of the device which provides for delivery of such check to the vending machine or other device with which it is associated. The two weighing operations which are employed for making the desired separation of proper and improper checks are the same in that if the check is equal to or in excess of a certain weight the check will be passed in one direction, and if below such weight will be passed in another direction. In the specific example above described, the first test to which the check is subjected is that of determining if it is underweight and the second test is that of determining whether or not it is overweight; the present invention, however, is not limited to an apparatus which operates according to this particular procedure in view of the fact that the check may equally well, by proper arrangement of the apparatus, be subjected to the overweight test prior to the underweight test.

Other objects of the invention will be pointed out in the subsequent description thereof or will be apparent therefrom. The following figures of drawings show two embodiments of the present invention, and referring thereto:

Fig. 1 is a partly sectional side elevation of a form of the present invention adapted for selection of underweight checks from correct or overweight checks;

Fig. 2 is a vertical section thereof taken on line 2—2 in Fig. 1;

Fig. 3 is a fragmentary view of the selector means showing the check-receiving position thereof;

Fig. 4 shows the selector means in the act of delivering an underweight check;

Fig. 5 shows the selector means in the act of delivering a correct or overweight check;

Fig. 6 is a view corresponding to Fig. 1, showing another modification of the device provided with double selector means for selection of proper checks from overweight and underweight checks;

Fig. 7 is a sectional view thereof on 7—7 in Fig. 6;

Fig. 8 is a view of the double selector means showing a check of proper or excess weight being delivered from the underweight selector;

Fig. 9 is a view showing a check being delivered to the overweight selector by the underweight selector;

Fig. 10 shows the overweight selector passing a check of correct weight; and

Fig. 11 shows the overweight selector rejecting an overweight check.

Referring to Figs. 1 to 5 of the drawings, the device of the present invention may comprise a housing 1 provided with a check-receiving opening 2 having a rear stop-wall portion 3 and positioned at the upper end of an inclined chute 4. The chute 4 is preferably wide enough to allow a check to roll freely therethrough in an upright position and is provided at its lower end with an impact or stopping wall 5, and a check discharge opening 6 adjacent said wall 5. The opening 6 is preferably only slightly wider than the diameter of the check to be selected, and in this connection, the opening 2 should be of slightly less diameter than the opening 6, so that any check which will pass through the opening 2 into the chute 4 may pass outwardly through said opening 6 and not be caught or jammed therein. The stop-wall portion 3 is provided to guide a check into position to fall into the chute 4, and to prevent the person inserting such check from giving the same any substantial lateral impetus. Immediately below the opening 6 I provide the selector means of the present invention which may comprise a balance member 7 pivotally mounted for rotation about an axis extending normal to the plane of the chute 4 and supported to one side of the center of gravity (indicated by the arrow C) of a check to be received thereby and in the plane of said check, the axis of said balance means being defined by means of a pivot pin 8 supported in some suitable manner as by means of a strap or the like 9 secured to the chute 4 or to some other stable portion of the device.

The balance means preferably comprises a pivotally mounted check-receiving member adapted for rotation in one direction about its pivotal axis from its normal or rest position, and means biasing said member to said normal position and opposing said rotation in said one direction. For example, the balance means 7 may advantageously comprise a check-receiving portion 11 having a bottom wall 11a and front and rear walls 11b and 11c respectively, and a weight member 12 preferably adjustably mounted thereon as by threaded engagement on an arm 13 extended downwardly from the check-receiving member and so positioned with respect to the pivotal axis 8 and the member 11, as to bias the balance means to a normal rest position such that the upper end thereof may receive a check 14 which is in position to fall downwardly through the opening 6, with the arm 13 and weight 12 suspended vertically downwardly from the check-receiving member and to oppose the rotation of said member in one direction, such as, for example, rotation in a clockwise direction as shown.

Referring particularly to Figs. 1 and 3, the check 14 will roll down the inclined floor of the chute 4 into engagement with the stopping wall 5, which will substantially absorb the momentum thereof, after which said check will start to fall through the opening 6 toward the balance member 11. In the present described form of the invention, I provide the balance member 11 with two check supporting members 15 and 16, the member 15 being positioned at the outer end of said member and comprising an initial impact receiving member and the member 16 being positioned inwardly of the member 15 and relatively close to the axis 8 and substantially vertically above said axis. The member 11 is positioned at an angle to the vertical so that it extends upwardly from the axis 8 toward the opening 6, and the supporting member 15 is positioned to prevent the check 14 from falling freely through said opening. As the check 14 falls through the opening 6, the lower edge thereof will impinge upon the member 15, and the weight of said check will overcome the weight of the weight 12 and cause a rotation of the balance means 7 in a clockwise direction by action on the relatively long lever arm provided by the position of said member 15. This member 15 is normally disposed so that it is substantially directly below the center of gravity of the check at the moment of impingement thereof by said check, and as the check progresses downwardly through the opening 6, it rests on the wall 5 and the member 15 until said member is moved through rotation of the balance means to a position to the right of the center of gravity of said check upon which the check will move to rest on the portion of the bottom wall of the chute 4 which defines the end of the opening 6 away from the wall 5, as shown at 6a. As the balance means 7 is further rotated due to the weight of the check 14 on the member 15 said check will gradually lower through the opening 6 until said member is separated from the portion 6a an amount equal to the diameter of said check, after which the check will fall freely into and be received by the member 11, and by this time said member 11 will be rotated to some position such as shown in dot-dash lines in Fig. 3, and the check thus falls downwardly into engagement with the inner check supporting member 16, as shown. The weight of the check 14 bearing against the members 15 and 16 thus exerts a turning moment on the member 7 on a lever arm whose length is materially less than when the lever arm was defined solely by the member 15, but due to the momentum of the check itself and the momentum which was imparted to the member 7, said member 7 will be rotated to approximately some such position as is shown in full lines in Fig. 4 dependent upon the weight of said check.

The provision of a relatively long lever arm upon which the check will act to move the balance means into check-receiving position, while providing a relatively short lever arm for the actual weighing operation, allows a very light weight check, such as an aluminum check which has its center punched out, to readily effect the desired positioning rotation of the balance means in the described manner. If the weight of the check 14 is equal to or greater than the correct weight of such a check, the weight of the check-receiving member 11 and check which is to the right of the axis 8 will over-balance the weight of the member 11 and the arm 13 and weight 12 which is to the left of the axis and cause the member 7 to pass through the position shown in full lines in Fig. 5 to a position such as is shown in dot-dash lines in said figure to which the member 15 is moved to the left of the center of gravity of the check 14 and said check topples out of the member 11, and the balance means 7 then returns to the position shown in Fig. 1 and the check falls into a chute 17 and thence to the associated apparatus as a check which has been accepted as being of equal weight or greater weight than the correct weight for such a check.

If, however, the weight of the check 14 is less than the correct weight, the momentum of the check will be absorbed in raising the weight 12 and the balance means will come to rest at a position approximating that shown in full lines in Fig. 4 and instead of the check and the right-hand portion of the balance means over-balancing the left-hand portion of the balance means, the weight 12 will fall downwardly and the check will be brought upwardly to a position such that the member 16 is to the right of the center of gravity of said check and said check will be discharged downwardly to the left into a suitable reject chute or the like 18. I prefer to provide a delivery wall 11d extending outwardly from adjacent the member 16 to the outer left-hand corner of the portion 11, along which an underweight check may roll in passing out of the balance means. Suitable stop means may be provided for the weight 12 and arm 13 to stop the same in its normal position of rest after discharging a check, and such stop means may conveniently comprise a cushioning bumper 19, of felt, cork, rubber or the like, positioned on the frame structure, or, for example, on the chute 17 as shown.

Referring to Figs. 6 to 11, I have shown therein an embodiment of the invention which provides not only for rejecting an underweight check but also provides for rejecting an overweight check, and such apparatus may comprise a housing structure 21 provided with a check-receiving opening or the like 22 positioned over a delivery chute 23 which corresponds to the delivery chute 4 above-described, and is provided with a stopping wall 24 and a discharge opening 25. Positioned below the opening 25 after the same manner as the member 7 heretofore described, I provide a balance means 26 which may be of substantially the same character as the means 7, but it is herein shown as provided with a check supporting member 27 corresponding to the member 15, and the axle 28 upon which said member is rotatably mounted may advantageously comprise the inner check supporting member corresponding to the member 16 above described, and a weight member 30, preferably adjustably mounted on a weight arm 31 is secured to the member 26, after the manner shown in connection with the member 7, supra. The operation of the member 26 in rejecting an underweight check may be substantially equivalent to the operation of the member 7 above-described, and will serve to discharge such underweight check into a reject chute 29. However, instead of discharging a correct or overweight check directly into a check-receiving chute, such a check, as shown at 14' in Fig. 8, is directed into an overweight balance means 32 pivotally mounted on an axle 33 and provided with a check supporting member 34. In order to prevent a check from being thrown past the member 31, I provide a stop member 35 positioned to engage the check and substantially absorb the momentum thereof, acting in much the same manner as the stop-wall 5, after which it is subject to the action of gravity and caused to bear downwardly against the member 34 of the balance member 32. As the weight of the check bears against the member 34, which defines the long lever arm of the balance, the balance member 32 will be rotated counter-clockwise until said supporting member is separated from the stop 35 a sufficient distance to allow the check to pass therebetween into engagement with the axle 33, as shown in dot-dash position in Fig. 9, in which the stop functions in a manner comparable to the function of the portion 6a, above described, and the member 26 returns to its normal position as shown in Fig. 6.

The member 32 is provided with a weight member 36 preferably adjustably mounted on an arm 37, and as the check 14' causes the aforesaid rotation of the member 32, the weight 36 will be raised to the right as shown in Fig. 9. Referring to Fig. 10, the member 32 will be caused to rotate to some such position as shown in full lines by the weight of the check acting on the short lever arm obtaining when the check is resting on the member 34 and the axle 33, and in this position, if the weight of the check is above the allowable minimum, the weight and weight arm will over-balance the same, and the member 32 will be moved to its normal or rest position, as shown in dot-dash lines in said figure, whereupon the member 34 will raise the check so that the center of gravity thereof (C) will be to the right of the axle 33, and the check will be discharged from the member 32 into a suitable hopper or chute 38.

On the other hand, if the weight of the check 14' is above the allowable minimum, the weight thereof will overbalance the weight and arm 36 and 37, and the balance means will be moved, as shown in Fig. 11, so that the check is gradually brought into position such that the center of gravity thereof is to the left of the member 34, and said check will be then caused to fall into the reject chute 29 (see dot-dash position in said figure). When the check is thus released from the member 32, said member will return to its normal or rest position shown in Fig. 6.

The balance means may be supported on the housing means 21, if desired, or may be supported on a suitable plate or the like 39 which is suitably secured to the housing as through the agency of bolts 41.

I also prefer to provide suitable stop means for the balance means, for example, a stop 42 positioned to limit the clock-wise rotation of the member 26, and a stop 43 to limit the return movement thereof; a stop 44 to limit the counter-clockwise movement of the member 32, and a stop 45 to limit the return movement thereof. The stop means 42 and 44 may be formed as a bent-out portion of the plate 39, if desired, while I prefer to make the stops 43 and 45 somewhat yielding in nature so that the shock of stopping the swinging weights attached to the respective members will not be so great as to get the device out of adjustment.

It will be understood that the balance weights 12, 38 and 36 may be adjusted to any desired lever arms, so that the respective balance means are responsive to checks of certain weights or, if desired, the weights may be made integral with the weight arm. The first-described form of the invention is adaptable for use where the light-weight amusement machine checks are in common circulatioin, but the last-described form of the invention is more suitable for general use, such as for example, in telephone coin boxes, in that the coin or check is subjected to a relatively rigid weight requirement before being passed as acceptable.

I claim:

1. A check selecting device comprising: downwardly inclined chute means having a downwardly directed opening at the lower end thereof; a pivotally mounted balance member having a check-receiving portion positioned below said opening; weight means secured to said balance member and biasing said check-receiving portion to the position aforesaid; check-supporting means on said balance member in position to engage a check delivered downwardly through said opening before complete delivery of said check from said opening in such manner as to cause rotation of said balance member in one direction in response to the weight and momentum of said check acting on said balance member through a lever arm of constant length defined by the position of said supporting means relative to the axis of said balance member during passage of said check through said opening, and said check-supporting means being further positioned to receive said check after complete delivery thereof from said opening and position the same within said check-receiving portion in such position that the weight of said check acts upon said balance member on a lever arm of constant length and shorter than said first-mentioned lever arm.

2. In a check selecting apparatus, a weight testing device comprising a pivotally mounted balance member biased in one direction and normally disposed in a rest position but free to rotate in a vertical plane in the opposite direction away from said rest position, check-supporting means on said balance member, means for delivering a check onto said balance member in such position as to produce a turning moment on said balance member in said opposite direction, by the weight of said check, said supporting means being so disposed as to receive and hold a check delivered thereto in a relatively fixed position with the center of said check relatively close to the axis of the balance member and the outer portion of said check-supporting means being positioned for intitial engagement by a check being delivered by said delivering means, whereby said check acts initially on said balance member at a relatively long lever arm, and said delivering means including check stop means so disposed as to maintain said check in engagement with only said outer portion of said supporting means until said balance member is rotated a certain distance in said opposite direction dependent upon the diameter of the delivered check and to then release said check and permit the same to fall into said relatively fixed position.

3. In a check selecting device, chute means, weight testing means associated with said chute means, said weight testing means comprising pivotally mounted balance means provided with check-supporting means including an impact member defining a lever arm, said balance means and said check impact member being so positioned with respect to said chute means as to prevent free delivery of a check therefrom by gravity but adapted, in response to the weight of a check acting on said impact member and said lever arm of said balance means to move to position to receive said check from said chute means and cause the weight of said check to act on a second lever arm of constant length and shorter than said first-mentioned lever arm of said balance means.

4. In a check selecting device, chute means, weight testing means associated with said chute means, said weight testing means comprising pivotally mounted balance means including check-supporting means provided with a check impact member so positioned with respect to said chute means as to prevent free delivery of a check therefrom by gravity but adapted, in response to the weight of a check acting on a long lever arm of said balance means to move to position to receive said check from said chute means and cause the weight of said check to act on a short lever arm of said balance means, said balance means being further adapted to move from said check-receiving position, in response to the weight and momentum of said check acting on said short lever arm, to a position to discharge an overweight check in one direction and to a position to discharge an underweight check in the opposite direction; another weight testing means comprising pivotally mounted balance means positioned in check-receiving relation to said first-named balance means and adapted to receive a check discharged therefrom in one direction; stop means cooperating with said first and second-named balance means to prevent free delivery of a check from said first to said second-named balance means by gravity, but said second-named balance means being adapted, in response to the weight of said check acting on a long lever arm of said second-named balance means to move to position to receive said check from said first-named balance means and cause the weight of said check to act on a short lever arm of said second-named balance means, and said second-named balance means being further adapted to move to said check-receiving position, in response to the weight and momentum of said check acting on said short lever arm, to a position to discharge an overweight check in one direction and to a position to discharge an underweight check in the opposite direction.

5. In a check selecting device, chute means having a check-delivering opening and fixed stop means adjacent said opening, and weight testing means associated with said chute means, said weight testing means comprising balance means pivotally mounted for rotation in a vertical plane and having a check-receiving portion normally positioned for engagement by a check being delivered from said check delivering opening and cooperating with said fixed stop means to prevent free delivery of a check from said opening by gravity but adapted, in response to the weight of a check so engaged acting on a relatively long lever arm of said balance means to move to position to release said check from said opening and to receive and hold said check in a relatively fixed position after receipt thereof, said balance means being further adapted to move in response to the weight and momentum of said check acting on a relatively short lever arm defined by said relatively fixed position thereof with respect to the axis of said balance means, to move in one direction to a position to discharge an overweight check and to move in the opposite direction to discharge an underweight check.

6. A check selecting device comprising: downwardly inclined chute means provided with a check delivering opening adjacent the lower end thereof and adapted to receive and convey a check to said opening in a vertical plane; balance means pivotally mounted laterally to one side of said opening and in the vertical plane of a check delivered thereby; check-supporting means on said balance means and having an impact portion positioned below said opening means and adapted to be engaged by a check being delivered through said opening and defining a lever arm through which the weight of said check may act to cause rotation of said balance means in one direction; means biasing said balance means against rotation in said one direction; said balance means being rotatable to a position such as to cause said check-supporting means to be moved to one side of said opening means and allow the check to be delivered therefrom and adapted to receive said check in such position that the weight thereof acts on a lever arm of constant length and shorter than said first-named lever arm, and, responsive to the weight of said check rotatable in said one direction to cause said supporting means to pass to one side of the received check whereby said check is delivered from said balance means by gravity; said chute means being provided with fixed stop means adjacent said opening and cooperating with said impact portion to maintain a check being delivered from said opening in engagement with only said impact portion during delivery of said check from said opening.

7. A check selecting device comprising: downwardly inclined chute means provided with a check delivering opening adjacent the lower end thereof and adapted to receive and convey a check to said opening in a vertical plane; a stopping wall at the lower end of said chute means adjacent said opening; balance means pivotally mounted laterally to one side of said opening and in the vertical plane of a check delivered thereby; said balance means being provided with a check-receiving portion normally positioned below said opening, said balance means being adapted for rotation in said vertical plane in such manner as to cause said check-receiving portion to move in a direction away from said one side of said opening; means biasing said balance means to a rest position with said check-receiving portion positioned in said normal position and opposing movement of said balance means in said direction; check-supporting means on said balance member so disposed as to receive a check delivered from said opening and hold the same in a relatively fixed position with the center of said check relatively close to the axis of said balance means, said check-supporting means having an outer portion positioned for initial engagement by a check passing downwardly through said opening and said chute means being provided with suitable means adjacent said opening cooperating with said outer portion, whereby said check acts initially on said balance member at a relatively long lever arm defined by said outer portion to produce said movement of said check-receiving portion.

8. A check selecting device comprising: downwardly inclined chute means provided with a check delivering opening adjacent the lower end thereof and adapted to receive and convey a check to said opening in a vertical plane; a stopping wall at the lower end of said chute means adjacent said opening; balance means pivotally mounted laterally to one side of said opening and in the vertical plane of a check delivered thereby; said balance means being provided with a check-receiving portion normally positioned below said opening, said balance means being adapted for rotation in said vertical plane in such manner as to cause said check-receiving portion to move in a direction away from said one side of said opening; means biasing said balance means to a rest position with said check-receiving portion positioned in said normal position and opposing movement of said balance means in said direction; check-supporting means on said balance member so disposed as to receive and hold a check delivered therethrough in a relatively fixed position with the center of said check relatively close to the axis of said balance means, said check-supporting means having an outer portion positioned for initial engagement by a check passing downwardly through said opening, whereby said check acts initially on said balance member at a relatively long lever arm to produce said movement of said check-receiving portion, said opening being so disposed with respect to said check-receiving portion and said outer portion of said check-supporting means as to maintain said check in engagement with only said outer portion of said supporting means until said balance member is rotated a certain distance in said direction and to then release said check and permit the same to fall into said relatively fixed position.

9. A check selecting apparatus comprising: a downwardly inclined chute adapted to receive and convey a check in a vertical position; stop means at the lower end of said chute for substantially absorbing lateral momentum of a check conveyed by said chute; said chute means having opening means adjacent said stop means for delivery of a check downwardly from said chute; a pivotally mounted balance member biased in one direction and normally disposed in a rest position but free to rotate in a vertical plane in the opposite direction away from said rest position; check-supporting means on said balance member, having an outer portion positioned for initial engagement by a check passing downwardly through said opening means whereby said check acts initially on said balance member at a relatively long lever arm to produce a turning movement of said balance member in said opposite direction by the weight of said check, and said supporting means being so disposed as to receive and hold a check delivered thereto in a relatively fixed position with the center of said check relatively close to the axis of said balance member after receipt of said check by said balance member; said outer portion of said supporting means cooperating with said opening means so as to maintain said check in engagement with only said outer portion until said balance member is rotated a certain distance in said opposite direction and to then release said check and permit the same to fall into said relatively fixed position; said balance member being adapted for further rotation in said opposite direction beyond said certain distance due to the weight and momentum of said check, and being adapted to thereafter swing further in said opposite direction in response to a check whose weight is sufficient to overcome the biasing thereof and discharge such check to one side thereof and to swing in said one direction in response to a check whose weight is insufficient to overcome the biasing thereof and discharge said last-mentioned check to the opposite side thereof.

10. The invention set forth in claim 9, and comprising in addition: stop means positioned to engage a check delivered by said balance member at one side thereof and substantially absorb the lateral momentum thereof; a second balance member rotatably disposed below said last-named stop means in the vertical plane of a check delivered by said first-named balance member, said second-named balance member being biased in one direction and free to rotate in the opposite direction; check-supporting means on said second-named balance member, having an outer portion positioned for initial engagement by a check delivered from said first-named balance member and cooperating with said second-named stop means to maintain said check in engagement with only said outer portion until said balance member is rotated a certain distance in said opposite direction in response to the weight of said check acting on a relatively long lever arm defined by said outer portion, and to then release said check and permit the same to fall into full engagement with said last-named supporting means and to be positioned thereby in a relatively fixed position with the center of said check relatively close to the axis of said second-named balance member.

11. In a check selecting apparatus, a weight testing device comprising: a balance member pivotally mounted for rotation about a substantially horizontal axis; means rotatively biasing said balance member in one direction; said balance member being normally disposed in a rest position but free to rotate from said rest position in a direction opposite to said first-named direction; a check-supporting member on said balance member spaced from the axis of rotation thereof and so positioned that, when said balance member is in said rest position, said check-supporting member is above said axis; and means for delivering a check downwardly onto said balance member and into engagement with said check-supporting member in such manner as to cause the weight of said check to exert a turning moment on said balance member in said opposite direction and produce rotation thereof in said opposite direction; said check delivering means being provided with means cooperating with said check-supporting member to guide said check downwardly until said balance member has rotated a certain distance in said opposite direction and to then release said check and permit the same to move by the action of gravity to a balancing position with its center of gravity materially close to said axis; said balance member being provided with means for supporting said check in said balancing position and holding the same relatively fixed with respect to said balance member; and said balance member being adapted, after delivery of said check to said balancing position, to rotate further in said opposite direction by the action of gravity on a check whose weight is not less than a certain amount, to a position to discharge such a check at one side of said balance member, and to rotate in said one direction against the action of gravity on a check whose weight is less than said certain amount, to a position to discharge such a check at the other side of said balance member.

12. A check-selecting apparatus comprising: check-delivering means; weight testing means associated with said delivering means and comprising a pivotally mounted balance member adapted for rotation in a vertical plane; check-supporting means on said balance member and including an impact portion positioned adjacent said delivering means in position to be impacted by a check delivered thereby and cause a rotation of said balance means in one direction; and stop means associated with said delivering means and so positioned with respect to said impact portion as to cooperate therewith to constrain a check within said delivering means and effect a rotation of said balance member solely by the action of asid check upon a relatively long lever arm defined by said impact portion until said balance member has rotated a certain distance and to then release such check from said delivering means; said supporting means being so disposed as to receive and hold a check, after release thereof from said delivering means, in a relatively fixed position with the center of said check relatively close to the axis of the balance member whereby the weight of said check acts upon said balance member through a lever arm materially shorter than the lever arm first-mentioned.

13. A check-selecting apparatus comprising: check-delivering means including a downwardly inclined chute adapted to convey a check in a vertical plane and provided with a downwardly directed check discharge opening adjacent the lower end of said chute; weight testing means including a pivotally mounted balance means disposed in check-receiving association with said chute means and adjacent said opening; means biasing said balance means in one direction toward a rest position; check-supporting means having an impact portion positioned below said opening in position to contact and oppose free downward passage of a check through said opening and to cause rotation of said balance means in the opposite direction in response to the weight of said check acting upon a lever arm defined by said impact portion; and stop means associated with said check discharge opening and so positioned with respect to said impact portion of said check-supporting means as to cooperate therewith to constrain a check within said delivering means until said balance member has rotated to a certain position away from said rest position and to then release said check from said delivering means; said check-supporting means including an additional portion cooperating with said impact portion to receive a check delivered from said delivering means and position the same in a relatively fixed position adjacent the axis of rotation of said balance means such that the weight of said check acts on said balance member at a lever arm materially shorter than said first-mentioned lever arm, and said balance member being freely rotatable in either direction from said certain position, in accordance with the weight of said check, to discharge a light-weight check in said one direction and a heavy-weight check in said opposite direction.

RALPH D. LYNCH.